United States Patent [19]

Muramoto

[11] Patent Number: 5,856,843
[45] Date of Patent: Jan. 5, 1999

[54] STEREOSCOPIC DISPLAY METHOD AND APPARATUS

[75] Inventor: Tomotaka Muramoto, Yokohama, Japan

[73] Assignee: Canon Kabushiki Kaisha, Tokyo, Japan

[21] Appl. No.: 427,141

[22] Filed: Apr. 24, 1995

[30] Foreign Application Priority Data

Apr. 26, 1994 [JP] Japan ................................. 6-110515
Feb. 22, 1995 [JP] Japan ................................. 7-058001

[51] Int. Cl.$^6$ .................................................. H04N 15/00
[52] U.S. Cl. ............................................. 348/52; 348/51
[58] Field of Search ................................ 348/42, 43, 51, 348/52, 46, 47, 54, 55; H04N 15/00

[56] References Cited

U.S. PATENT DOCUMENTS

| | | |
|---|---|---|
| 4,145,713 | 3/1979 | White . |
| 4,510,525 | 4/1985 | Kuperman et al. ................ 348/52 |
| 4,535,354 | 8/1985 | Rickert ............................. 348/52 |
| 4,567,513 | 1/1986 | Imsand . |
| 4,582,393 | 4/1986 | Shieman ........................... 348/42 |
| 4,709,263 | 11/1987 | Brumage ........................... 348/42 |
| 4,740,836 | 4/1988 | Craig ............................... 348/42 |
| 5,220,441 | 6/1993 | Gerstenberger .................. 358/487 |
| 5,448,294 | 9/1995 | Yamazaki ......................... 348/51 |

OTHER PUBLICATIONS

Patent Abstracts of Japan, vol. 016, No. 134 (E–1185), Apr. 6, 1992, for JP3295393, Dec. 26, 1991, "Automatic Discrimination Device of Stereoscopic Picture".

*Primary Examiner*—Brian Casler
*Assistant Examiner*—Luanne P. Din
*Attorney, Agent, or Firm*—Morgan & Finnegan, L.L.P.

[57] ABSTRACT

A stereoscopic display apparatus discriminates image signals for the left and right eyes by comparing the received image signals, and displays an image without adding special signals for discriminating the left and right eyes. A mechanical connection between an image pickup and an image display is not needed to properly distinguish left and right eye images.

9 Claims, 13 Drawing Sheets

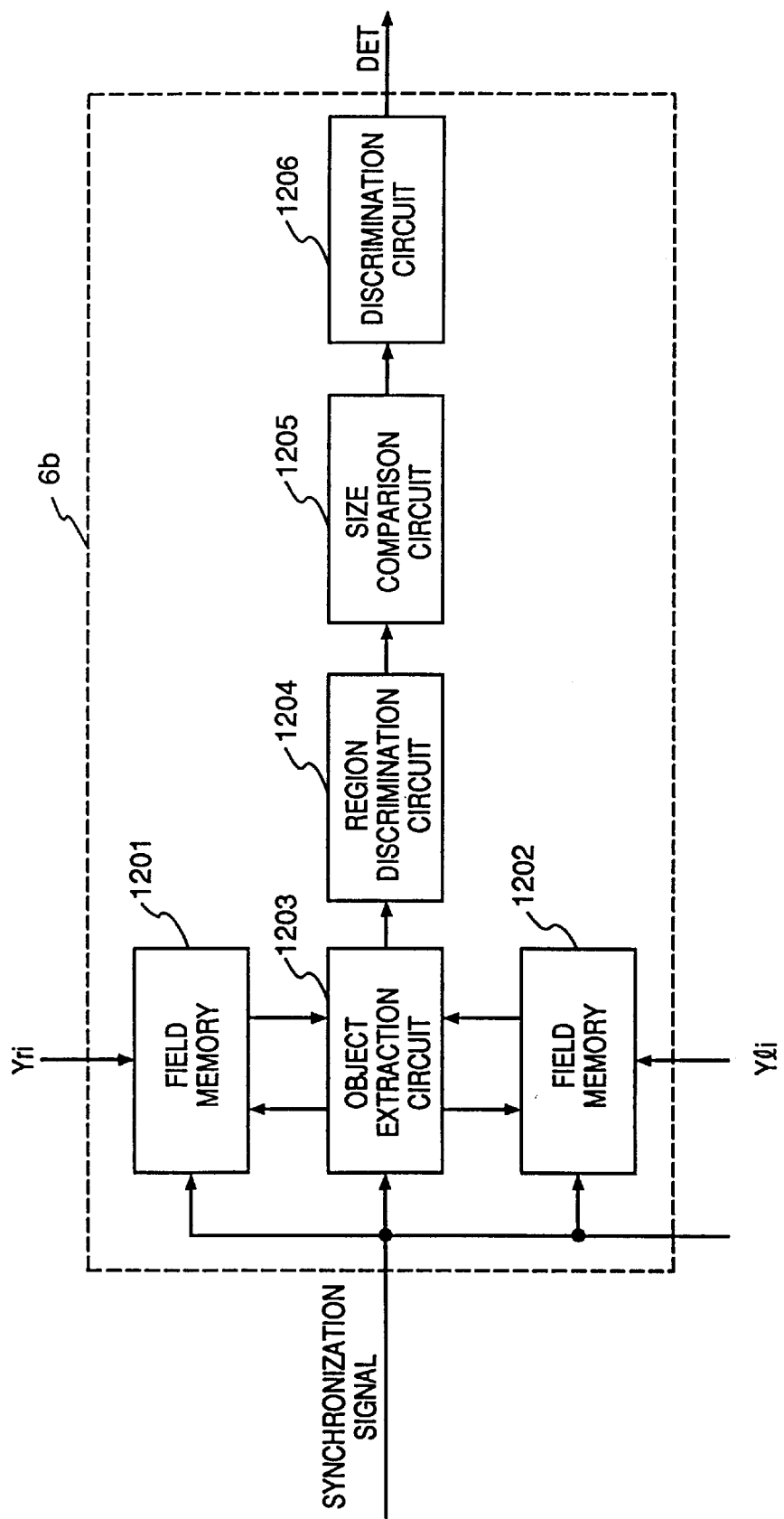

STEREOSCOPIC DISPLAY METHOD AND APPARATUS

BACKGROUND OF THE INVENTION

The present invention relates to a stereoscopic display method and apparatus such as a stereoscopic television system, which can achieve a stereoscopic view on the basis of two, right and left image signals having a parallax.

In general, a stereoscopic display apparatus achieves a stereoscopic view by displaying image signals for the right and left eyes on display units for the right and left eyes, respectively.

In this case, a reproduction apparatus (display apparatus side) must discriminate the image signals for the right and left eyes from each other. For this purpose, a conventional apparatus adopts a method of adding a discrimination pulse to one image signal or changing the number of cycles of a color burst signal in one image signal on the image pickup device side.

However, in the conventional stereoscopic display apparatus, the image pickup device requires a circuit for adding a discrimination signal or a circuit for changing the number of cycles of the color burst signal, while the reproduction apparatus requires a circuit for extracting the added discrimination signal or a circuit for detecting the number of cycles of the color burst signal, resulting in a complicated system arrangement.

As for a stereoscopic television system, a standard such as CCIR or the like is not determined yet. For this reason, even when a certain system adds a discrimination signal, the added signal cannot often be discriminated by another system.

On the other hand, in place of adding such a discrimination signal, a user may connect, by himself or herself, image signals for the right and left eyes to the display units for the right and left eyes, respectively. However, if the user erroneously recognizes the image signals for the right and left eyes, if he or she keeps watching an image displayed in such a state, his or her eyes suffer considerable fatigue.

SUMMARY OF THE INVENTION

The present invention has been made to solve the above-mentioned problems, and has as its object to provide a stereoscopic display apparatus which can discriminate image signals for the right and left eyes and can normally display an image without adding any special signals for discriminating the image signals for the right and left eyes.

The above-mentioned object is achieved by the following apparatus or method.

A stereoscopic display apparatus which receives two different image signals, and displays the two different image signals on display means having portions for right and left eyes, respectively, comprises: right/left discrimination means for discriminating, based on a correlation between the input two different image signals, which of the two different image signals corresponds to a signal for the right or left eye; and switching means for switching image signals to be output to the display means on the basis of a discrimination result of the right/left discrimination means.

A stereoscopic display method which receives two different image signals, and displays the two different image signals on display means for right and left eyes, respectively, comprises: a right/left discrimination step of discriminating, based on a correlation between the input two different image signals, which of the two different image signals corresponds to a signal for the right or left eye; and a switching step of switching image signals to be output to the display means on the basis of a discrimination result of the right/left discrimination step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiment of the invention and, together with the description serve to explain the principles of the invention.

FIG. 12 is a block diagram showing the arrangement of a switching circuit in a display apparatus according to the fifth embodiment of the present invention.

DESCRIPTION OF THE PREFERRED EMBODIMENTS

Preferred embodiments of the present invention will be described in detail in accordance with the accompanying drawings.

(First Embodiment)

The first embodiment of the present invention will be described below with reference to FIGS. 1 to 4.

Figure 1:
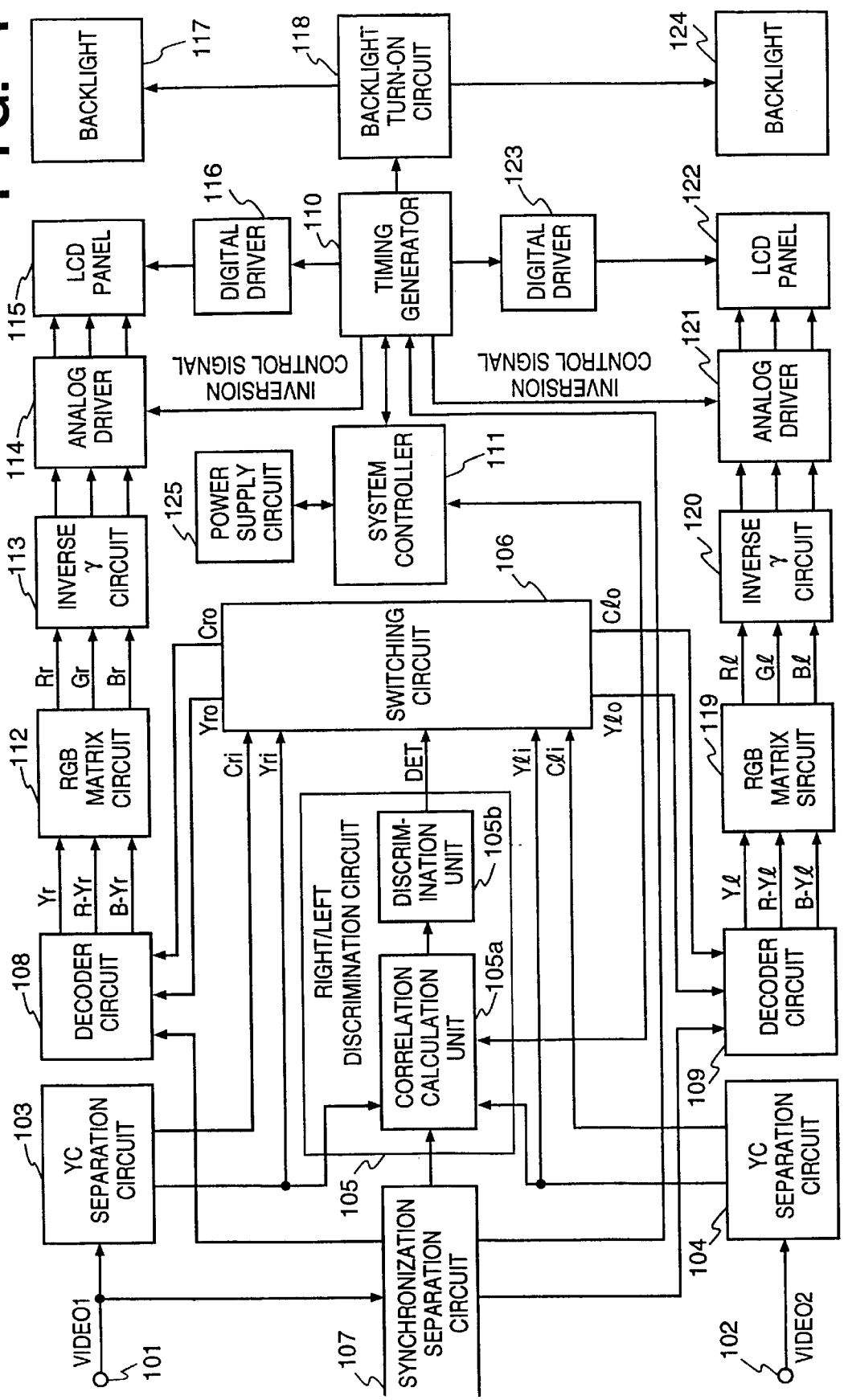
FIG. 1 is a block diagram showing the arrangement of a stereoscopic display apparatus according to the first embodiment of the present invention.

FIG. 1 is a schematic block diagram showing the arrangement of a stereoscopic display apparatus according to this embodiment. Referring to FIG. 1, reference numerals 101 and 102 denote input terminals which respectively receive a composite video signal VIDEO1 as an image signal for the right eye and a composite video signal VIDEO2 as an image signal for the left eye. In this embodiment, the right and left composite video signals VIDEO1 and VIDEO2 are synchronized with each other, and are input in a state wherein they can be driven based on the same timing relationship. A power supply voltage for operating this display apparatus is supplied from a power supply circuit 125. When a switch in the power supply circuit 125 is turned on, the power supply voltage is supplied to respective blocks via connection lines (not shown).

The input terminals 101 and 102 are respectively connected to YC separation circuits 103 and 104 each for separating the video signal into a luminance signal and a chrominance signal. The YC separation circuit 103 and 104 are connected to a right/left discrimination circuit 105 for discriminating whether or not the right and left video signals are normally input, and a switching circuit 106 for outputting the right and left video signals to appropriate blocks on the basis of the discrimination result of the right/left discrimination circuit 105. The right/left discrimination circuit 105 comprises a correlation calculation unit 105a and a discrimination unit 105b. The input terminal 101 is also connected to a synchronization separation circuit 107 for extracting a synchronization signal from the input video signal VIDEO. The synchronization separation circuit 107 is connected to the right/left discrimination circuit 105, decoder circuits 108 and 109 for the image signals for the right and left eyes, and a timing generator 110, and outputs a synchronization signal to these circuits.

The switching circuit 106 is connected to the decoder circuits 108 and 109 for the right and left eyes, and outputs the image signals for the right and left eyes to the decoder circuits 108 and 109 for the right and left eyes, respectively.

The decoder circuit 108 is connected to a liquid crystal panel 115 via an RGB matrix circuit 112, an inverse γ circuit 113, and an analog driver 114. The analog driver 114 comprises a signal inversion circuit for inversion-driving the liquid crystal panel 115, an amplifier circuit for amplifying an input signal to a signal amplitude required for driving the liquid crystal panel 115, and a buffer circuit for outputting the image signal for the right eye to the liquid crystal panel 115. The analog driver 114 is connected to the timing generator 110, and its operation timing is controlled. The timing generator 110 generates timing signals for ON/OFF control of pixel transistors of the liquid crystal panel 115 and for transfer clocks of a shift register on the basis of the synchronization signal separated and output from the synchronization separation circuit 107 under the control of a system controller 111. These timing signals are input to the analog driver 114, a digital driver 116 for driving the liquid crystal panel 115, a backlight 117 for illuminating the liquid crystal panel 115 from the rear surface side, and a backlight turn-on circuit 118 for driving the backlight 117.

The decoder circuit 109, an RGB matrix circuit 119, an inverse γ circuit 120, an analog driver 121, a liquid crystal panel 122, a digital driver 123, and a backlight 124 as the arrangement for processing the image signal for the left eye are respectively connected in the same manner as the above-mentioned decoder circuit 108, RGB matrix circuit 112, inverse γ circuit 113, analog driver 114, liquid crystal panel 115, digital driver 116, and backlight 117. The analog driver 121 and the digital driver 123 display an image for the left eye on the liquid crystal panel 122 in synchronism with the analog driver 114 and the digital driver 116 for the right eye on the basis of the operation timing signals output from the timing generator 110.

In the above-mentioned arrangement, the video signal VIDEO1 input via the input terminal 101 is separated into a luminance signal Yri and a chrominance signal Cri by the YC separation circuit 103. The luminance signal Yri is input to the right/left discrimination circuit 105 and the switching circuit 106, and the chrominance signal Cri is input to the switching circuit 106. On the other hand, the video signal VIDEO2 input via the input terminal 102 is separated into a luminance signal Yli and a chrominance signal Cli by the YC separation circuit 104. The luminance signal Yli is input to the right/left discrimination circuit 105 and the switching circuit 106, and the chrominance signal Cli is input to the switching circuit 106.

The synchronization signal extracted by the synchronization separation circuit 107 is input to the right/left discrimination circuit 105 together with the luminance signals Yri and Yli. The right/left discrimination circuit 105 extracts signal components corresponding to a scanning line position used for discrimination from the right and left luminance signals Yri and Yli by a method to be described later on the basis of the synchronization signal input from the synchronization separation circuit 107. Then, the circuit 105 discriminates whether or not the right and left video signals are normally input, and outputs a discrimination signal DET of HIGH level if it is determined that the right and left video signals are normally input; otherwise, it outputs a discrimination signal DET of LOW level. The discrimination signal DET is input to the switching circuit 106 together with the luminance signals Yri and Yli and the chrominance signals Cri and Cli. The right/left discrimination circuit 105 is also connected to the system controller 111, and the level of the discrimination signal DET is checked.

The operation of the right/left discrimination circuit 105 will be described below with reference to FIGS. 2A to 3.

Figure 2A:
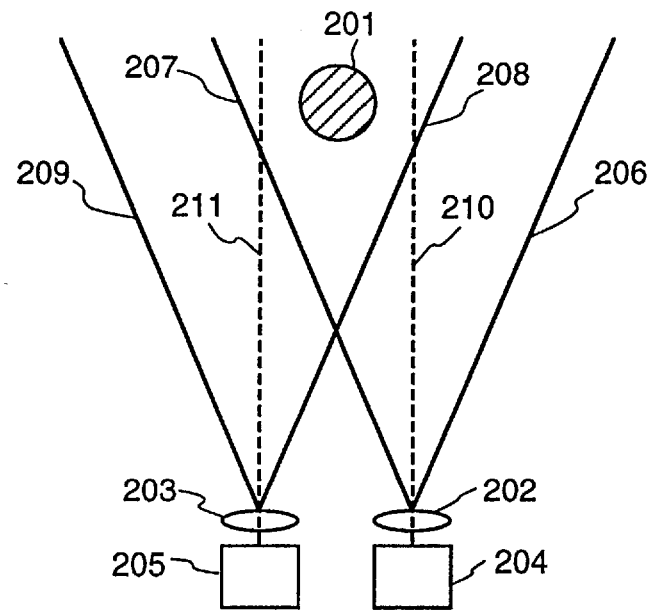
FIGS. 2A to 2C are explanatory views for explaining the right/left discrimination operation executed by a right/left discrimination circuit shown in FIG. 1.

FIG. 2A is a view for explaining the relationship between an object and the fields of view of photographing lenses in an image pickup device for obtaining a stereoscopic image to be displayed on the display apparatus. Referring to FIG. 2A, reference numeral 201 denotes an object; 202 and 203, photographing lenses for the right and left eyes; and 204 and 205, image pickup elements for the right and left eyes. The field of view of the photographing lens 202 for the right eye is indicated by solid lines 206 and 207, and the field of view of the photographing lens 203 for the left eye is indicated by solid lines 208 and 209. Broken lines 210 and 211 respectively represent the optical axes of the right and left photographing lenses, and the two optical axes 210 and 211 are set to be parallel to each other.

Figure 2B:
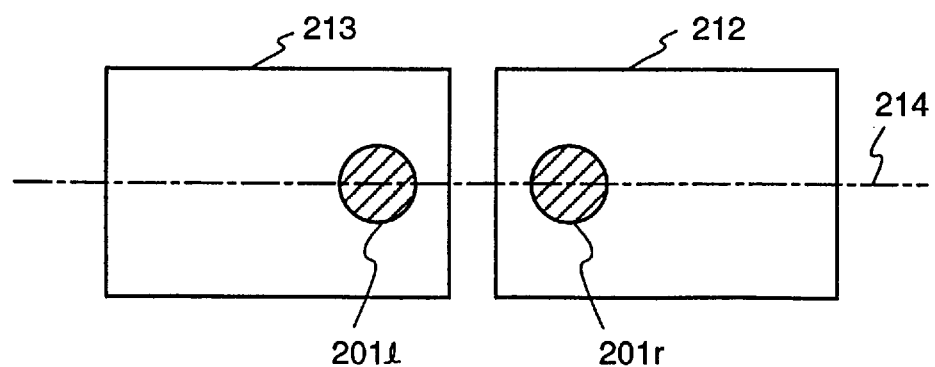

FIG. 2B is a view showing images formed on the image pickup elements 204 and 205. Referring to FIG. 2B, reference numerals 212 and 213 denote field frames of the photographing lenses for the right and left eyes, respectively; and 201r and 201l, images of the object 201 formed on the right and left image pickup elements 204 and 205, respectively.

Figure 2C:

FIG. 2C shows the signal waveforms of a scanning line corresponding to a position indicated by an alternate long and short dashed line 214 in FIG. 2B. Signal waveforms 215 and 216 respectively correspond to one scanning line used for discrimination of the above-mentioned luminance signals Yri and Yli.

As can be seen from FIGS. 2B and 2C, when the optical axes 210 and 211 of the photographing lenses are set to be parallel to each other, the position of the object image 201r in the field frame 212 is near the left end, and the position of the object image 201l in the field frame 213 is near the right end. In order to detect a relative positional relationship, in the right-and-left direction, of the object on the basis of the signal waveforms shown in FIG. 2C, the correlation calculation unit 105a performs a correlation calculation between the signal waveforms 215 and 216.

More specifically, if the signal waveform 215 in the field frame 212 is represented by Xr(t) and the signal waveform 216 in the field frame 213 is represented by Xl (t), a correlation calculation result (correlation parameter) Clr(T) is given by:

$$Clr(\tau) = (1/T) \int_0^T Xr(t) \cdot Xl(t + \tau) dt \qquad (1)$$

note that the integral range is one horizontal scanning period T.

Figure 3:
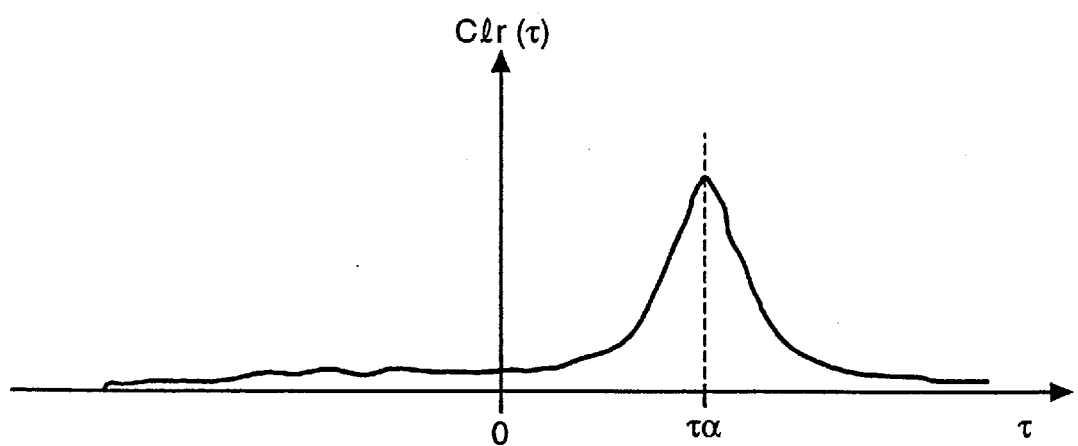
FIG. 3 is a graph showing the correlation calculation result by the right/left discrimination circuit shown in FIG. 1.

When the correlation calculation is executed based on equation (1), the result shown in FIG. 3 is obtained. More specifically, when the correlation calculation is executed based on image data Xr(t) for the right eye, a value τα corresponding to a peak value of the calculation result Clr(T) is a positive value.

On the other hand, when the image signals for the right and left eyes are input to the wrong sides, since the value τα corresponding to a peak value is a negative value, whether or not the right and left video signals are normally input can be discriminated by checking the polarity of the value τα.

Figure 4:
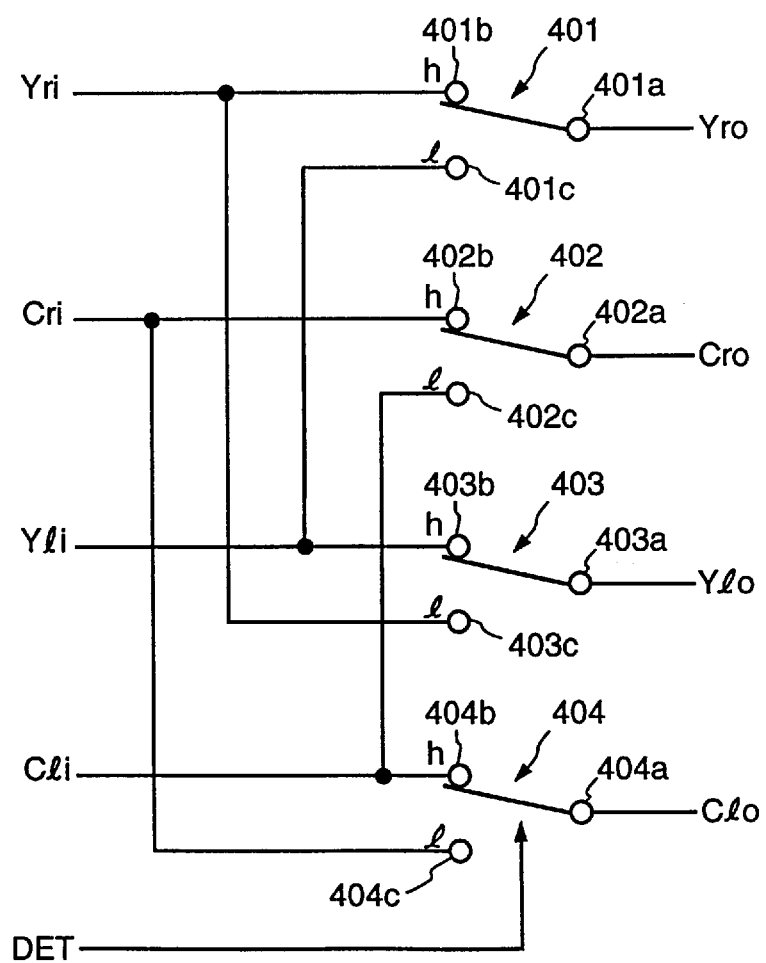
FIG. 4 is a circuit diagram showing the arrangement of a switching circuit shown in FIG. 1.

The switching circuit 106 will be described below with reference to FIG. 4. FIG. 4 is a circuit diagram showing the arrangement of the switching circuit 106. The switching circuit 106 has analog switches 401 to 404 for switching an input signal. The analog switches 401 to 404 are switching-controlled by a single control signal DET. More specifically, output terminals 401a to 404a are connected to h terminals 401b to 404b when the control signal DET is at HIGH level, and are connected to l terminals 401c to 404c when the control signal DET is at LOW level. The output terminals 401a and 402a are connected to the decoder circuit 108 for the right eye, and the output terminals 403a and 404a are connected to the decoder circuit 109 for the left eye.

As described above, the switching circuit 106 receives the luminance signals Yri and Yli, the chrominance signals Cri and Cli, and the discrimination signal DET output from the right/left discrimination circuit 105. The luminance signal Yri input from the YC separation circuit 103 for the image signal for the right eye is input to the h terminal 401b of the analog switch 401 and the l terminal 403c of the analog switch 403, and the chrominance signal Cri is input to the h terminal 402b of the analog switch 402 and the l terminal 404c of the analog switch 404. On the other hand, the luminance signal Yli input from the YC separation circuit 104 for the image signal for the left eye is input to the l terminal 401c of the analog switch 401 and the h terminal 403b of the analog switch 403, and the chrominance signal Cli is input to the l terminal 402c of the analog switch 402 and the h terminal 404b of the analog switch 404.

In this arrangement, when the video signal VIDEO1 for the right eye is input to the input terminal 101, and the video signal VIDEO2 for the left eye is input to the input terminal 102, the discrimination signal DET output from the right/left discrimination circuit 105 changes to HIGH level. At this time, since all the output terminals 401a to 404a of the analog switches 401 to 404 are connected to the h terminals 401b to 404b, output signals Yro, Cro, Ylo, and Clo from the output terminals 401a to 404a are respectively equal to the input signals Yri, Cri, Yli, and Cli. On the other hand, when the video signal VIDEO2 for the left eye, which is to be input to the input terminal 102, is input to the input terminal 101, and the video signal VIDEO1 for the right eye, which is to be input to the input terminal 101, is input to the input terminal 102, since the discrimination signal DET output from the right/left discrimination circuit 106 changes to LOW level, all the output terminals 401a to 404a of the analog switches 401 to 404 are connected to the input terminals 401c to 404c, and the output signals Yro, Cro, Ylo, and Clo from the output terminals 401a to 404a are respectively equal to the input signals Yli, Cli, Yri, and Cri. Therefore, even when the video signals for the right and left eyes are input to the wrong sides, the image signal for the right eye can be normally input to the decoder circuit 108 for the right eye, and the image signal for the left eye can be normally in put to the decoder circuit 109 for the left eye.

Referring back to FIG. 1, the chrominance signal Cro of the video signal for the right eye, which is input to the decoder circuit 108 for the right eye by the above-mentioned method, is converted into baseband color difference signals R-Yr and B-Yr, and the converted signals are input to the RGB matrix circuit 112 in synchronism with the synchronization signal. On the other hand, the luminance signal Yro is output as a signal Yr without being subjected to any special processing. The RGB matrix circuit 112 respectively converts the color difference signals R-Yr and B-Yr, and the luminance signal Yr into R, G, and B signals Rr, Gr, and Br, and the R, G, and B signals are input to the analog driver 114 after they are subjected to gradation correction in the inverse γ circuit 113. The analog driver 114 inverts and switches the R, G, and B signals Rr, Gr, and Br in accordance with an input inversion control signal from the timing generator 110, amplifies these signals, and outputs analog image signals to the liquid crystal panel 115 for the right eye.

The liquid crystal panel 115 displays the input analog image signals under the driving control of the digital driver 116. At this time, the system controller 111 monitors the output state of the discrimination signal DET output from the right/left discrimination circuit 105. When the controller 111 determines that the output state of the discrimination signal is not inverted for a predetermined period of time, i.e., stabilized, it controls the timing generator 110 to turn on the backlight 117.

On the other hand, the decoder circuit 109, RGB matrix circuit 119, inverse γ circuit 120, analog driver 121, liquid crystal panel 122, digital driver 123, and backlight 124 constitute the arrangement for processing the image signal for the left eye, and operate in the same manner as the above-mentioned decoder circuit 108, RGB matrix circuit 112, inverse circuit 113, analog driver 114, liquid crystal panel 115, digital driver 116, and backlight 117. Thus, a detailed description thereof will be omitted.

As described above, according to this embodiment, even when the video signals for the right and left eyes are input to the wrong sides, the right/left discrimination circuit 105 can discriminate such a state, and the switching circuit 106 can switch circuits, so that the image signal for the right eye can be normally input to the decoder circuit 108 for the right eye, and the image signal for the left eye can be normally input to the decoder circuit 109 for the left eye.

(Second Embodiment)

Figure 6A:
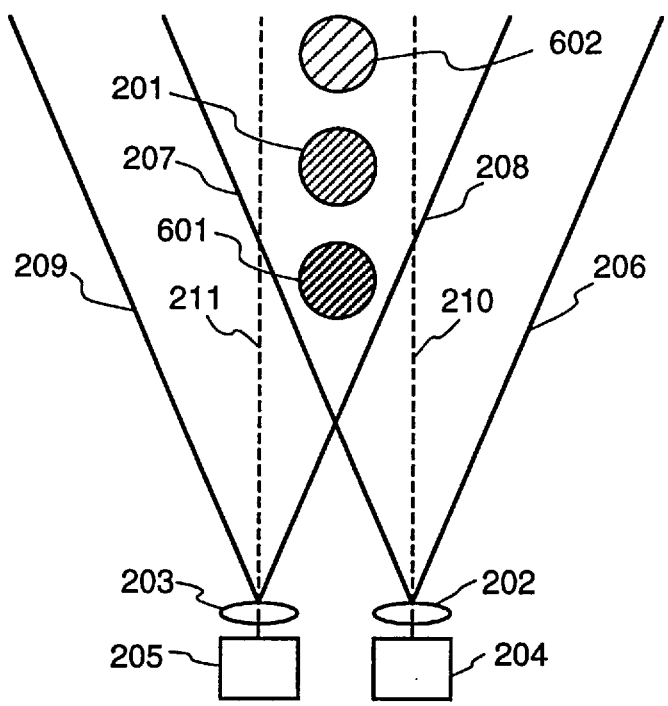
FIGS. 6A and 6B are explanatory views for explaining the right/left discrimination operation executed by a right/left discrimination circuit shown in FIG. 5.
Figure 6B:
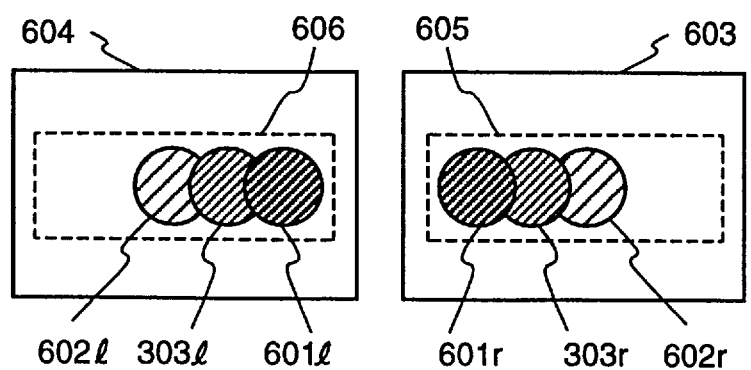
Figure 7:
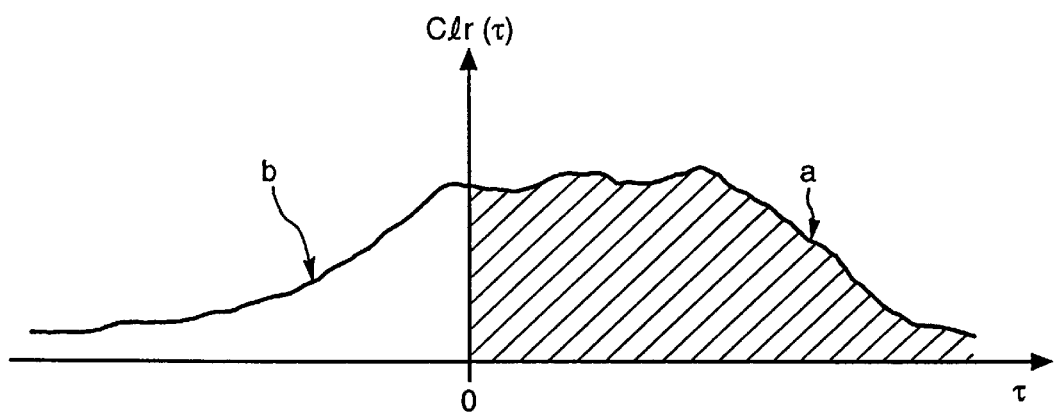
FIG. 7 is a graph showing the correlation calculation result by the right/left discrimination circuit shown in FIG. 5.

The second embodiment of the present invention will be described below with reference to FIGS. 5 to 7.

Figure 5:
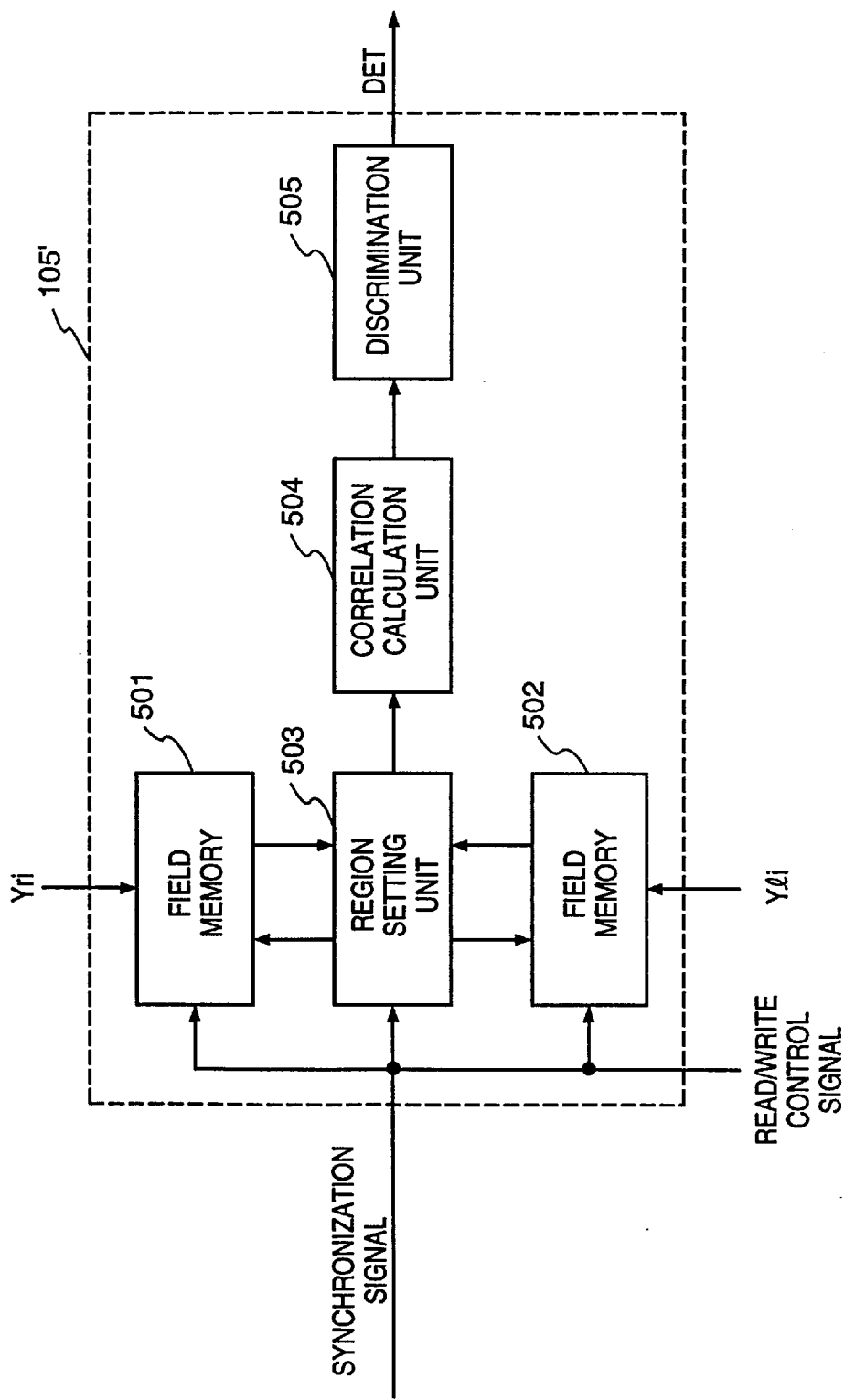
FIG. 5 is a block diagram showing the arrangement of a right/left discrimination circuit used in a stereoscopic display apparatus according to the second embodiment of the present invention.

The display apparatus according to this embodiment adopts a right/left discrimination circuit 105' shown in FIG. 5 in place of the right/left discrimination circuit 105 shown in FIG. 1 in the first embodiment described above. The right/left discrimination circuit 105' comprises field memories 501 and 502, a region setting unit 503, a correlation calculation unit 504, and a discrimination unit 505. Note that other arrangements are the same as those of the display apparatus shown in FIG. 1 in the first embodiment, and will be described while quoting FIG. 1.

A luminance signal Yri separated from a video signal VIDEO1 by the YC separation circuit 103 is input to the field memory 501, and a luminance signal Yli separated from a video signal VIDEO2 by the YC separation circuit 104 is input to the field memory 502. The read/write control of the field memories 501 and 502 is executed by the system controller 111. A synchronization signal extracted by the synchronization separation circuit 107 is input to the region setting unit 503.

The region setting unit 503 extracts only image data in a range, in which it is estimated that a principal object is present, from the right and left image signals. In a normal photographing operation, since the principal object is normally located at the center of the frame, image data near the center of the frame are extracted from the luminance signals Yri and Yli, as indicated by broken lines in FIG. 6B, and the extracted data are input to the correlation calculation unit 504.

The correlation calculation unit 504 executes a correlation calculation between the image signals for the right and left eyes in the same manner as in the first embodiment, and the discrimination unit 505 discriminates, based on the correlation calculation result, whether or not the right and left video signals are normally input. As a result of discrimination, if the right and left video signals are normally input, a discrimination signal DET of HIGH level is output; otherwise, a discrimination signal DET of LOW level is output.

The operation of the right/left discrimination circuit 105' will be described below with reference to FIGS. 6A to 7. FIG. 6A is a view for explaining objects and the fields of view of photographing lenses in an image pickup device for obtaining a stereoscopic image to be displayed on the stereoscopic display apparatus, and illustrates a state wherein objects 601 and 602 are added to the state of FIG. 2A in the first embodiment. FIG. 6B shows images formed on the image pickup elements 204 and 205 in FIG. 6A. Referring to FIG. 6B, reference numerals 603 and 604 denote field frames of the photographing lenses for the right and left eyes, respectively; 601r and 601l, images of the object 601 formed on the right and left image pickup elements 204 and 205, respectively; and 602r and 602l, images of the object 602 formed on the right and left image pickup elements 204 and 205, respectively.

The region setting unit 503 sets regions indicated by broken lines 605 and 606 in FIG. 6B in the field frames 603 and 604. When the correlation calculation between two image data in these ranges is executed, a correlation parameter $Clr(\tau)$ shown in FIG. 7 is obtained. As can be seen from FIG. 7, when there are a plurality of objects, a clear peak value does not appear. However, as can be understood from a comparison between an area (integral value) Sa of a region a satisfying $\tau>0$ indicated by hatching in FIG. 7, and an area (integral value) Sb of a region b satisfying $\tau<0$, Sa>Sb. Therefore, by comparing the areas Sa and Sb of the regions a and b, when Sa>Sb, it is determined that the right and left image data are normally input, and when Sa<Sb, it is determined that the right and left image data are input to the wrong sides.

As described above, according to this embodiment, when there are a plurality of objects, the correlation calculation is performed for the entire data in a region where it is estimated that the objects are present, in place of the correlation calculation using image data for one scanning line. Therefore, background images in the field frames can be removed, and right/left discrimination can be accurately performed for an object with a complicated shape.

(Third Embodiment)

The third embodiment of the present invention will be described below with reference to FIGS. 8 and 9.

Figure 8:
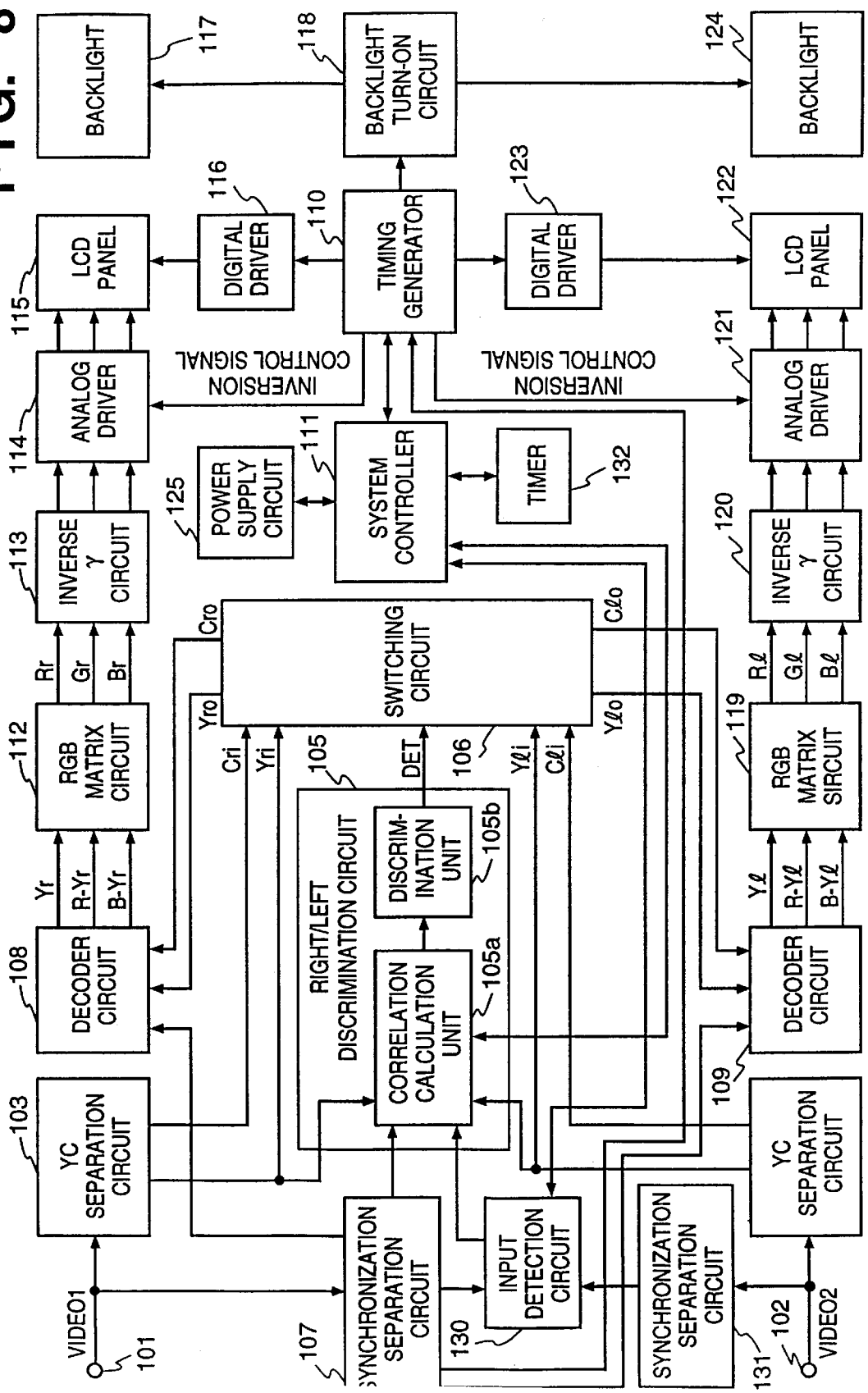
FIG. 8 is a block diagram showing the arrangement of a stereoscopic display apparatus according to the third embodiment of the present invention.
Figure 9:
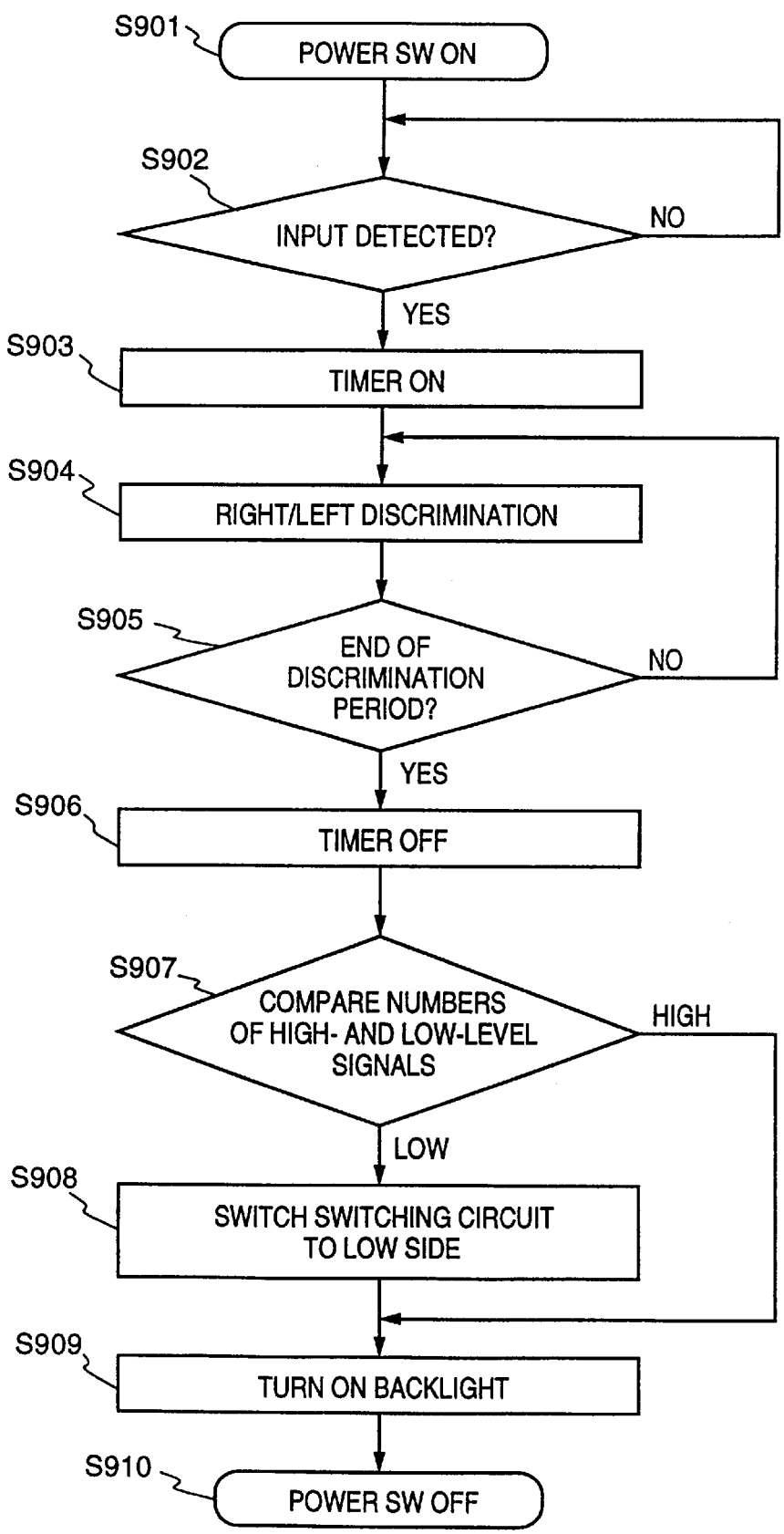
FIG. 9 is a flow chart for explaining the right/left discrimination operation sequence of the third embodiment.

FIG. 8 is a block diagram showing the arrangement of a display apparatus according to this embodiment. This display circuit comprises, as new circuits, an input detection circuit 130 for detecting inputs of video signals, a synchronization separation circuit 131 for extracting a synchronization signal from a video signal VIDEO2 for the left eye, and a timer 132 which is connected to the system controller 111 and measures time from the input timing of the video signals. The input detection circuit 130 is connected to the synchronization separation circuits 107 and 131, and receives synchronization signals separated from video signals VIDEO1 and VIDEO2. Furthermore, the input detection circuit 130 is connected to the right/left discrimination circuit 105 and the system controller 111, and outputs an input detection signal to the right/left discrimination circuit 105 and the system controller 111. The right/left discrimination circuit 105 is not connected to the switching circuit 106, and outputs a discrimination signal DET to the system controller 111. The switching control of the switching circuit 106 is executed by the system controller 111. Other arrangements are the same as those in FIG. 1 in the first embodiment, and the same reference numerals in FIG. 8 denote the same parts as in FIG. 1.

A video signal VIDEO2 input via the input terminal 102 is input to the synchronization separation circuit 131, and a synchronization signal extracted by the circuit 131 is input to the input detection circuit 130. At the same time, a synchronization signal extracted, by the synchronization separation circuit 107, from a video signal VIDEO1 input via the input terminal 101 is also input to the input detection circuit 130. The input detection circuit 130 detects the input of the image signals by checking, e.g., the pulse intervals of the two synchronization signals.

The right/left discrimination operation sequence executed in the display apparatus with the above arrangement will be described below with reference to the flow chart shown in FIG. 9.

When the power switch of the power supply circuit 125 is turned on (step S901), the input detection circuit 130 starts its operation (step S902). If it is detected that the video signals are input to both the input terminals 101 and 102, the input detection circuit 130 outputs an input detection signal indicating the input of the video signals to the system controller 111. Upon reception of the input detection signal, the system controller 111 starts the timer 132 (step S903), and starts the operation of the right/left discrimination circuit 105 (step S904).

The right/left discrimination circuit 105 repetitively performs the right/left discrimination operation by the above-mentioned method until a predetermined period of time elapses from the start of the timer, and outputs the discrimination results to the system controller 111 (step S905). The system controller 111 stores all the discrimination results (HIGH or LOW levels of the discrimination signals) input from the right/left discrimination circuit 105 before an elapse of the predetermined period of time. After the elapse of the predetermined period of time, the system controller 111 stops the timer 132 (step S906), and compares the numbers of HIGH- and LOW-level signals of the obtained discrimination results (step S907).

In an initial state after power-ON, the output terminals 401a to 404a of the analog switches 401 to 404 in the switching circuit 106 are connected to the h terminals 401b to 404b. If the system controller 111 determines in step S907 that the number of HIGH-level discrimination signals DET is larger than that of LOW-level discrimination signals DET, it maintains the switching circuit 106 in the initial state; otherwise, it switches the output terminals 401a to 404a to the l terminals 401c to 404c (step S908). Upon completion of the operation of the switching circuit 106, the system controller 111 controls the timing generator 110 to drive the backlight turn-on circuit 118 (step S909). In this state, the liquid crystal panels 115 and 122 are set in an image display state, and keep displaying an image until the power switch is turned on (step S910).

As described above, according to this embodiment, since the right and left signals are finally discriminated based on the majority rule after an elapse of a predetermined period of time from the input of the right and left video signals, the discrimination can be performed more accurately. Furthermore, the switching circuit is controlled in accordance with the discrimination result, and is not switched once the discrimination result is obtained. For this reason, the operation during display can be stabilized.

As described above, according to the stereoscopic display apparatus of each of the above embodiments of the present invention, in a stereoscopic display apparatus which receives two different image signals, and displays the two different image signals on two display means for the right and left eyes, respectively, the right/left discrimination means discriminates, based on a correlation between the input two different image signals, if each of the two different image signals corresponds to a signal for the right or left eye, and the image signals output to the two display means are switched on the basis of the discrimination result. Therefore, the image signals for the right and left eyes can be accurately discriminated and displayed without adding any special signal for discriminating the image signals for the right and left eyes from each other.

According to the stereoscopic display apparatus of each of the above embodiments of the present invention, since the right/left discrimination means discriminates, in a region set by the region setting means, if each of the two different image signals corresponds to a signal for the right or left eye, the right/left discrimination can be accurately performed for an object with a complicated shape in addition to the above effect.

According to the stereoscopic display apparatus of each of the above embodiments of the present invention, the signal input discrimination means discriminates if the two different image signals are input. The right/left discrimination means discriminates signals for the right and left eyes a plurality of number of times for a predetermined period of time from when the signal input discrimination means discriminates that the two different image signals are input, and determines the majority of the discrimination results. Thereafter, the image signals are switched by the switching means on the basis of the result corresponding to the majority. Therefore, whether or not image signals for the right and left eyes are normally input can be discriminated more accurately.

According to the stereoscopic display apparatus of each of the above embodiments of the present invention, since the switching operation of image signals by the switching means is stopped after the elapse of the predetermined period of time, the operation during display of the display apparatus can be stabilized.

(Fourth Embodiment)

The fourth embodiment of the present invention will be described with reference to FIGS. 10A to 10C, 11A, and 11B. Note that the basic arrangement of a display apparatus of this embodiment is the same as that of the first embodiment in FIG. 1, and the arrangement of a right/left discrimination circuit of the fourth embodiment is identical to that in FIG. 5. The fourth embodiment will also be described with reference to FIGS. 1 and 5.

In the above-mentioned embodiments, the optical axes of the right and left cameras are set to be parallel to each other. However, in the fourth embodiment, the optical axes of right and left cameras cross each other at a given vergent angle.

Figure 10A:
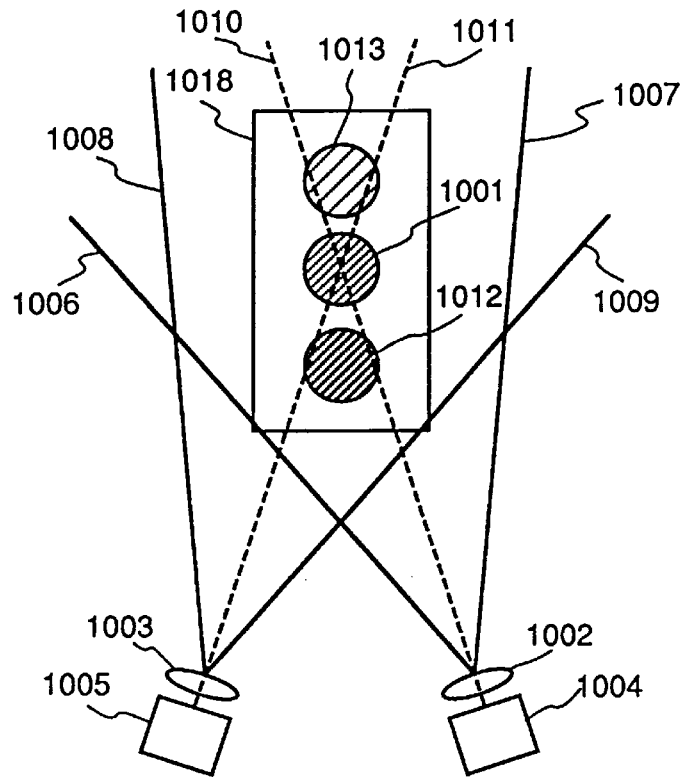
FIGS. 10A to 10C are views for explaining the operation of a display apparatus according to the fourth embodiment of the present invention.

FIG. 10A is a view showing a state in which spherical objects 1013, 1001, and 1012 are vertically arranged on a table 1018, and optical axes 1011 and 1010 of the left and right cameras are focused on the object 1001. In this case, the images of the right and left cameras are shown in FIGS. 10B and 10C.

Figure 10B:
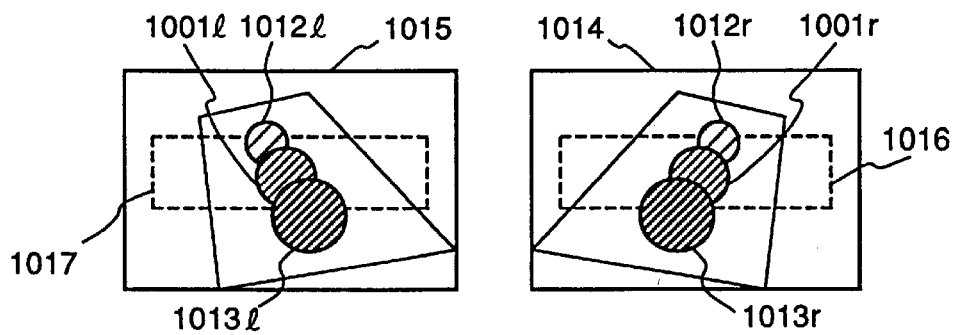
Figure 11A:
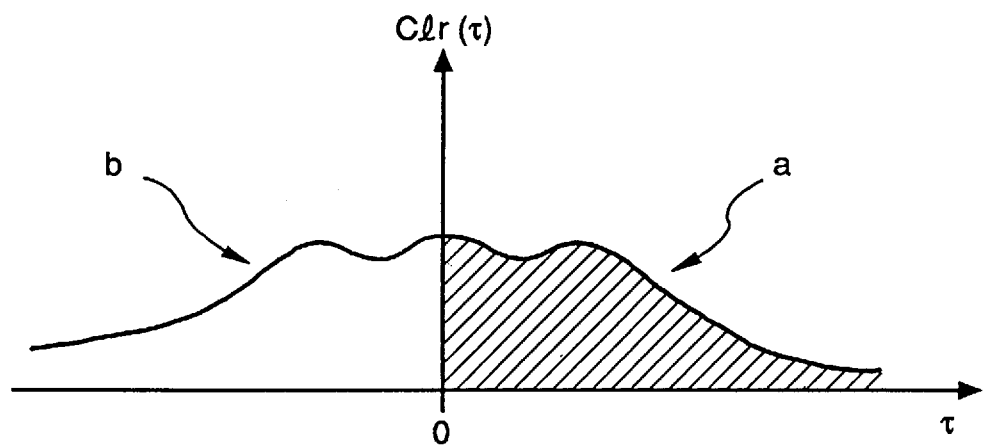
FIGS. 11A and 11B are views showing the correlation calculation result in the display apparatus according to the fourth embodiment.

FIG. 10B shows discrimination regions 1016 and 1017 defined at locations where the objects are present as in the second embodiment. When a correlation calculation is performed for these discrimination regions 1016 and 1017 as in the second embodiment, a graph shown in FIG. 11A is obtained. In this case, since the optical axes 1011 and 1010 of the left and right cameras are directed toward the objects, the correlation values are almost symmetrical about τ=0, unlike in FIG. 7. The right/left discrimination operation cannot be performed by comparing a region a with a region b.

Figure 10C:
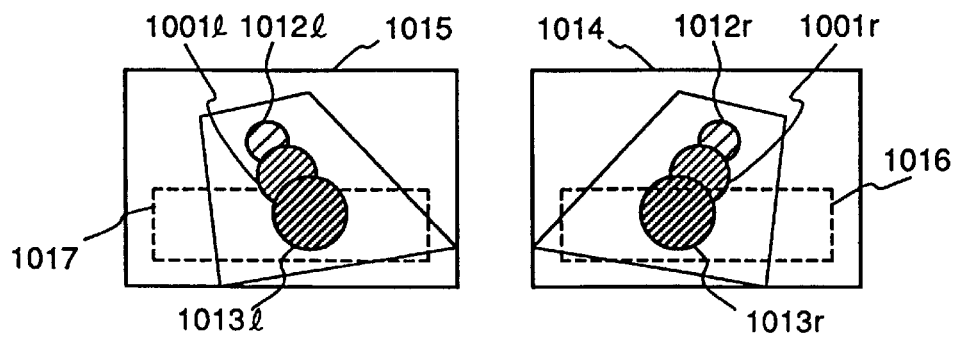
Figure 11B:
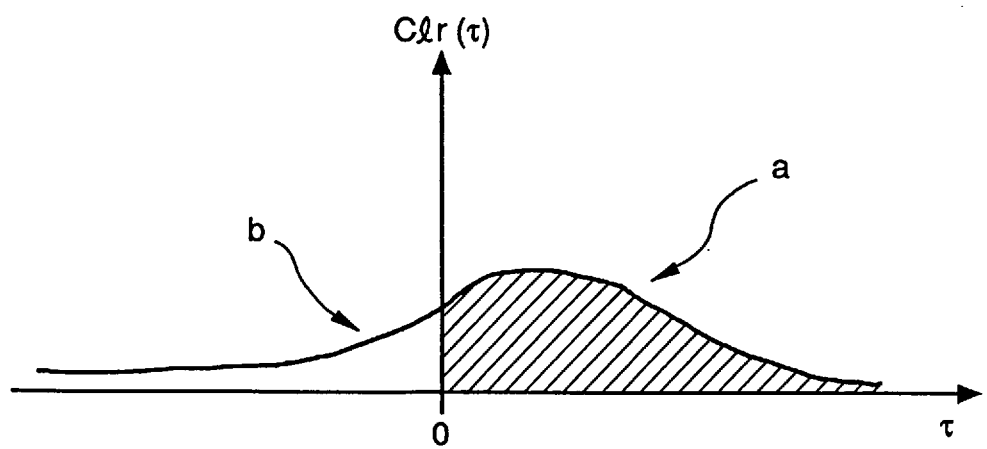

FIG. 10C shows a state in which the discrimination regions 1016 and 1017 are set below the central portion of the frame using a region setting unit 503 in FIG. 5. In general, within a photographing frame, when a camera faces toward a principal object, an object photographed in the lower portion of the frame is located in the left portion of the frame in the left camera and in the right portion of the frame in the right camera because the object in the lower portion of the frame is located in front of the principal object. For this reason, correlation values obtained when the discrimination regions 1016 and 1017 are defined, as shown in FIG. 10C, are given as follows. The region a having a positive τ values has a larger area than the region b having a negative τ values, as shown in FIG. 11B. Therefore, the areas of the regions a and b are compared with each other to allow right/left discrimination as in the second embodiment.

Note that the above description applies to a case in which an object is photographed from a camera above the object. However, when an object is photographed by a camera below the object, the discrimination regions 1016 and 1017 are set above the central portion of the frame by the region setting unit 503, and the following processing is performed to allow right/left discrimination, as a matter of course.

According to this embodiment, right/left discrimination can be performed even if the optical axes 1011 and 1010 of the left and right cameras are not set to be parallel to each other.

(Fifth Embodiment)

The fifth embodiment of the present invention will be described with reference to FIGS. 12, 13A, and 13B. The basic arrangement of a display apparatus according to this embodiment is the same as that of the first embodiment in FIG. 1, and the fifth embodiment will also be described with reference to FIGS. 1 and 5. The fifth embodiment is different from the first embodiment in the arrangement of a right/left discrimination circuit.

FIG. 12 is a block diagram showing the arrangement of a right/left discrimination circuit 6b in the display apparatus according to this embodiment. Referring to FIG. 12, a signal input to the right/left discrimination circuit 6b is luminance signals Yri and Yli, and a synchronization signal. A signal output from the right/left discrimination circuit 6b is also a discrimination signal DET. Unlike in the first embodiment, the fifth embodiment additionally includes first and second field memories 1201 and 1202, an object extraction circuit 1203, a region discrimination circuit 1204, a size comparison circuit 1205, and a discrimination circuit 1206.

The right and left luminance signals Yri and Yli are temporarily stored in the first and second field memories 1201 and 1202. Data exchange is performed between the field memories 1201 and 1202 and the object extraction circuit 1203 to extract an object within the frame. The region discrimination circuit 1204 discriminates whether the extracted object is located in the left or right half of the frame. In addition, the sizes of the right and left input images of the identical object are compared by the size comparison circuit 1205. Right/left discrimination is then performed by the discrimination circuit 1206 on the basis of the comparison result.

Figure 13A:
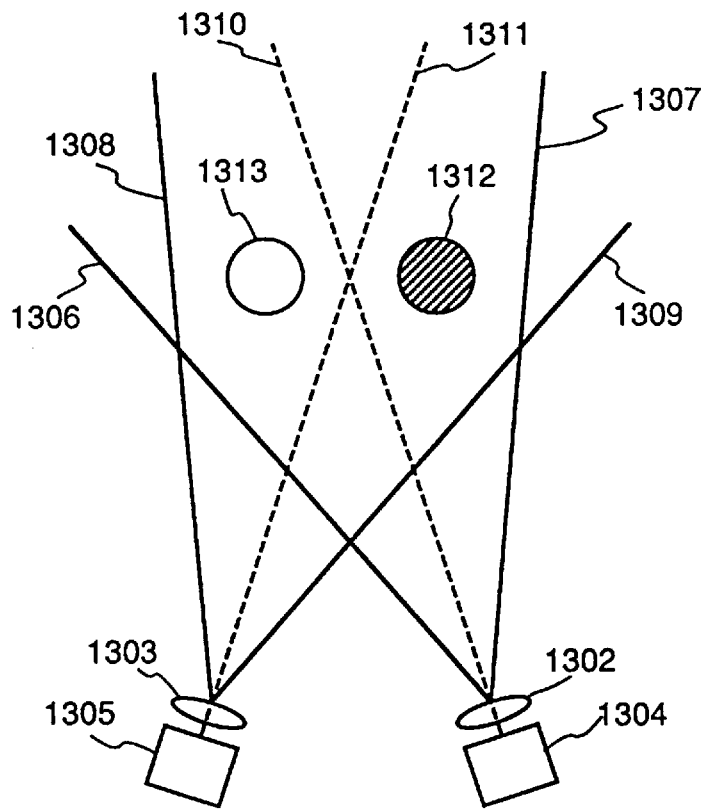
FIGS. 13A and 13B are views for explaining the operation of the display apparatus according to the fifth embodiment.
Figure 13B:
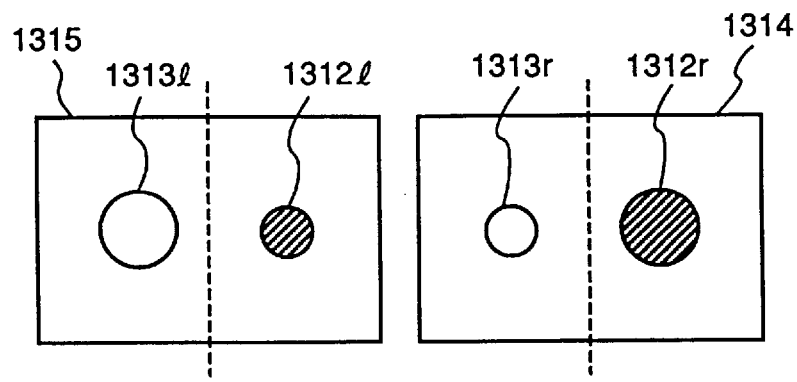

This discrimination method is shown in FIGS. 13A and 13B. FIG. 13A shows a state in which two objects 1312 and 1313 are photographed by left and right cameras whose optical axes 1311 and 1310 have a given vergent angle. In this case, the photographing frames are shown in FIG. 13B. In this embodiment, object portions of the images shown in FIG. 13B are extracted by the object extraction circuit 1203 in accordance with a contour extraction method or the like, and the right and left corresponding object images are specified in accordance with a correlation calculation or the like. In this case, an image 1312l corresponds to an image 1312r, and an image 1313l corresponds to an image 1313r. The region discrimination circuit 1204 then discriminates whether each of the corresponding objects is located in the right or left half of the frame. This can be easily -known in accordance with addresses of data in the first and second field memories 1201 and 1202. In addition, the sizes of the objects are compared with each other by the size comparison circuit 1205. This size comparison is performed as follows. Correlation calculations are performed while the image magnification is changed step by step. An image magnification corresponding to the maximum correlation value is discriminated, and size comparison is performed at this image magnification.

Note that although the region discrimination circuit discriminates whether each of the corresponding objects is located in the right or left half of the frame, the area of a region to the left of the center of the object is compared with the area of a region to the right of the center of the object, and a larger region is selected, as a matter of course. In the object extraction circuit 1202, the objects are subjected to segmentation in accordance with contour extraction to perform matching processing. Alternatively, the object extraction circuit 1202 may determine the image magnification described with reference to the size comparison circuit 1205, and matching processing between the right and left images may be performed at the determined image magnification. This matching processing is performed after the objects of the right and left images are scaled.

In the processing of the size comparison circuit 1205 and the discrimination circuit 1206, scaling data of the objects of the matched right and left images are equivalent to the size comparison result between the objects. Therefore, right/left discrimination can be performed on the basis of the scaling data for the objects.

As can be apparent from FIG. 11B, the image of the right camera is larger than that of the left camera in the right half of the frame. However, the image of the left camera is larger than that of the right camera in the left half of the frame. For this reason, the region discrimination circuit 1204 in FIG. 12 discriminates that a larger image of the object 1312 discriminated to be located on the right side is discriminated as the image of the right camera. To the contrary, a larger image of the object 1313 discriminated to be located on the left side is discriminated as the image of the left camera.

FIGS. 12, 13A, and 13B have exemplified that the number of objects is two. However, when the number of corresponding objects is increased, precision of right/left discrimination can be improved.

According to this embodiment, right/left discrimination can be performed when the optical axes of the right and left cameras are not set to be parallel to each other as in the first and second embodiments or when an appropriate object is not photographed in the lower portion of the frame as in the fourth embodiment.

As has been described above, in the display apparatus of the present invention, right and left images can be correctly connected with a simple arrangement without adding a circuit for adding a right/left discrimination signal to the image pickup device.

As many apparently widely different embodiments of the present invention can be made without departing from the spirit and scope thereof, it is to be understood that the invention is not limited to the specific embodiments thereof except as defined in the appended claims.

What is claimed is:

1. A stereoscopic display apparatus which receives two different image signals, and displays the two different image signals, comprising:

display means for stereoscopic display having portions for right and left eyes;

right/left determination means for discriminating, based on a correlation between the input two different image signals, determining which of the two received different image signals corresponds to a signal for the right or left eye by comparing the two different image signals to each other and for generating a determination result; and switching means for switching image signals to be output to the display means based on the determination result of said right/left determination means.

2. The apparatus according to claim 1, wherein said right/left determination means comprises correlation value calculation means for calculating a correlation value representing the correlation between image data of the two different image signals, and determines based on the calculated correlation values which of the two different image signals corresponds to a signal for the right or left eye.

3. The apparatus according to claim 2, wherein said right/left determination means comprises region setting means for setting a region for determining which of the two different image signals corresponds to a signal for the right or left eye.

4. The apparatus according to claim 2, further comprising:

signal input discrimination means for discriminating whether or not the two different image signals are input, and wherein said right/left determination means determines the signals for the right and left eyes a plurality of times for a predetermined period of time from when said signal input discrimination means discriminates that the two different image signals are input, and determines a majority result based on the determinations, and said switching means switches the image signals on the basis of the majority result.

5. A stereoscopic display method which receives two different image signals, and displays the two different image signals on display means for stereoscopic display for right and left eyes, respectively, comprising:

a right/left determination step of determining which of the two received different image signals corresponds to a signal for the right or left eye by comparing the two different image signals to each other and for generating a determination result;

a switching step of switching the two different image signals to be output to the display means based on the determination result of said right/left determination step; and a displaying step of displaying the two different image signals on the display means.

6. The method according to claim 5, wherein said right/left determination step comprises correlation value calculation step of calculating a correlation value representing the correlation between image data of the two different image signals, and determines, based on the calculated correlation value, which of the two different image signals corresponds to a signal for the right or left eye.

7. The method according to claim 6, wherein said right/left determination step comprises a region setting step of setting a region for determining which of the two different image signals corresponds to a signal for the right or left eye.

8. The method according to claim 6, further comprising:

a signal input discrimination step of discriminating whether or not the two different image signals are input, and wherein said right/left determination step determines the signals for the right and left eyes a plurality of times for a predetermined period of time from when said signal input discrimination step discriminates that the two different image signals are input, and determines a majority result based on the determinations, and said switching step switches the image signals on the basis of the majority result.

9. A stereoscopic display apparatus which receives two different image signals, and displays the two different image signals, comprising:

display means for stereoscopic display having portions for right and left eyes;

right/left determination means for determining which of the two received different image signals corresponds to a signal for the right or left eye by comparing the two different image signals to each other and for generating a determination result; and switching means for providing the two received different image signals to proper output terminals for the right eye and for the left eye based on the determination result of said right/left determination means.

* * * * *

UNITED STATES PATENT AND TRADEMARK OFFICE
CERTIFICATE OF CORRECTION

PATENT NO. : 5,856,843
DATED : January 5, 1999
INVENTOR(S) : Tomotaka Muramoto

It is certified that error appears in the above-identified patent and that said Letters Patent is hereby corrected as shown below:

Column 3, line 26: change "VIDEO" to --VIDEO1--;

Column 6, line 47: after "inverse" and before "circuit", insert --$\gamma$--;

Column 7, line 55: underline "a";

Column 7, line 58: underline "a";

Column 8, line 1: after "per" and before "formed", insert a hyphen;

Column 10, line 39: underline first "a";

Column 10, line 39: change "T" to --$\tau$--;

Column 10, line 42: underline "a";

Column 11, line 34: change "-known" to --known--;

UNITED STATES PATENT AND TRADEMARK OFFICE
CERTIFICATE OF CORRECTION

PATENT NO. : 5,856,843
DATED : January 5, 1999
INVENTOR(S) : Tomotaka Muramoto

It is certified that error appears in the above-identified patent and that said Letters Patent is hereby corrected as shown below:

Claim 2, line 5: after "determines", insert --,--;

Claim 2, line 6: change "values" to --value,--;

Signed and Sealed this

Thirteenth Day of April, 1999

Attest:

Q. TODD DICKINSON

Attesting Officer

Acting Commissioner of Patents and Trademarks